April 10, 1928.
R. L. BINNEY
1,665,435
NONFERROUS CASTING
Filed July 6, 1925
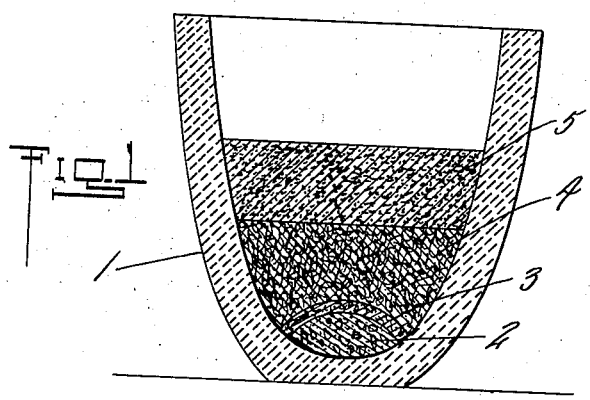
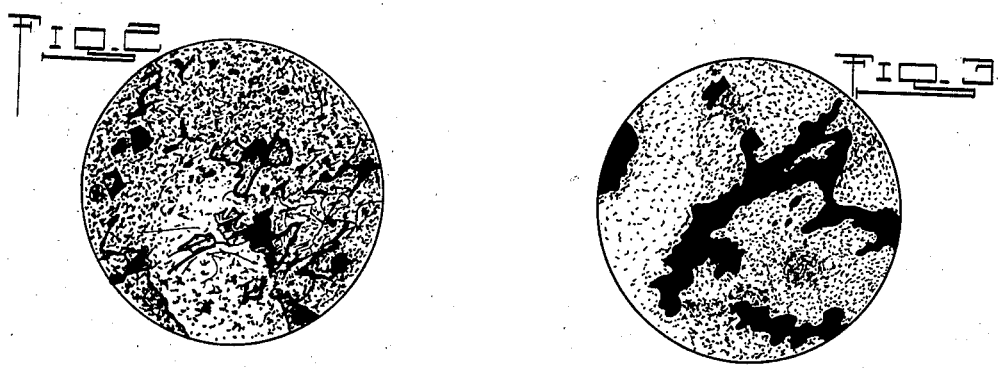
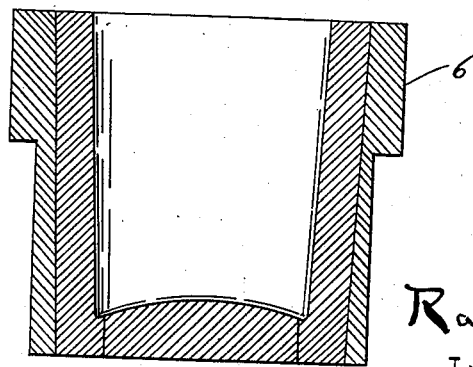
Ralph L. Binney
INVENTOR
Geo E Kirk
ATTORNEY Patented Apr. 10, 1928.

1,665,435

UNITED STATES PATENT OFFICE.

RALPH L. BINNEY, OF TOLEDO, OHIO, ASSIGNOR TO THE BINNEY CASTINGS COMPANY, OF TOLEDO, OHIO, A CORPORATION OF OHIO.

NONFERROUS CASTING.

Application filed July 6, 1925. Serial No. 41,821.

This invention relates to special texture production in metals.

This invention has utility in the production of non-ferrous metals capable of taking a fine surface and holding such as resistant to heat and acid, rendering the product peculiarly advantageous for linings for molten glass receiving molds especially in the so-called paste type of molds.

Referring to the drawings:

Fig. 1 is a view of the general melt arrangement in the crucible;

Fig. 2 is a view of a portion of the surface of a cast of approximately one hundred diameters magnification, say as etched by ferric-chloride solution;

Fig. 3 is a view of a portion of the surface of a cast from the melt herein etched by ferric-chloride solution and magnified approximately four hundred diameters; and Fig. 4 is a section through a lined mold for glass.

Crucible 1 is shown as having first charged thereinto of ferro-manganese 2 covered with fragments of aluminum scrap or aluminum alloy 3 over which is charged the copper 4 under a heavy layer of charcoal 5. This crucible charge is placed in a furnace and has the heat thereof run up say to 2050° F. at which point zinc fragments are stirred thereinto, and just before casting of this melt, the remaining portion of the aluminum is added. This aluminum alloy serves as a de-oxidizer and also gives the metal a fluidity for minute form or detail in the casting. The zinc serves in the product to prevent oxidation or retard such. The iron helps the detail of the cast and the iron as well as the manganese increase the melting point to retard oxidation.

The proportions for the melt may run about eight pounds of ferro-manganese in a sub-divided or powdered form; eighty-two pounds of copper scrap, pure; ten pounds of zinc ingot; one pound of aluminum scrap which is preferably 92% aluminum and about 8% copper. The aluminum is divided, half being in the charge and the remainder is added to the melt.

The cast from such a charge approximates: copper—83.13%; zinc—9.56%; manganese—4.70%; aluminum—1.46%; iron—.67%; lead—.12%; tin—a trace; total 99.64%. The copper gives a high heat conductivity to the cast as well as a higher melting point. The high heat conductivity as imparted by the copper makes this type of mold one which will so rapidly take away the heat of the glass that the mold may have a higher capacity output than the ferrous type of mold of molten glass forming machines. There may be economy in operation in that this type of mold need not be cooled. The aluminum has a fluxing tendency. With this copper base in the range of between eighty and ninety percent, there is a melting point in a resulting product which has as its surface a texture unusual in a non-ferrous metal. The surface as etched with ferric-chloride solution and shown in Fig. 2 seems to be heterogeneous, but of a crystalline nature. As shown by the larger magnification of Fig. 3, the internal structure of what seemed to be the crystals is seemingly of an amorphous character. There is no lamellar structure. There is no scaling or plate disintegration from corrosion or other action. The substance takes a high polish and is so resistant to temperature and acid that when exposed to molten glass, the silicic acid or the high temperature do not attack this mold for scaling or corrosion, and the substance while undergoing slight wear does not irregularly disintegrate, but maintains its smooth texture of definite polished form and surface and any attack is effective only in the removal of the most minute dust. There is no attack upon the ware as formed. The substance of the mold does not dissolve with the glass. A mold 6, whether entire or lined with this cast, accordingly has the advantages of paste mold for glassware which may be moved relatively to the glass. Furthermore, this mold seems to take up the heat of the glass in a way to maintain a superior character of ware. The life of the mold is increased.

The normal etching agents for micrographs are nitric acid, hydrochloric acid, and with bronzes which are extremely resistant, an ammonia hydrogen peroxide solution. The texture of the material as herein disclosed would not respond to etching by these ordinary agents and resort was made to ferric-chloride.

What is claimed and it is desired to secure by United States Letters Patent is:—

1. A refractory alloy of approximately one part manganese, two parts zinc, eighteen parts copper, and one-third part aluminum.

2. A mix for a refractory alloy approximating eight pounds ferro-manganese; eighty-two pounds copper; ten pounds zinc; and one pound aluminum.

3. A refractory alloy having copper content in excess of 80%, zinc in excess of 7%, and the remaining portion consisting essentially of aluminum, manganese, and iron, said alloy being acid resistant and having no lamellar structure.

4. A refractory alloy having iron and manganese in excess of 3 parts; copper in excess of 80 parts; zinc in excess of 7 parts; and aluminum in excess of 1 part by weight, said alloy having a non-lamellar structure and being resistant to scaling off from molten glass attack.

In witness whereof I affix my signature.

RALPH L. BINNEY.